United States Patent [19]
Klein

[11] Patent Number: 5,137,405
[45] Date of Patent: Aug. 11, 1992

[54] BULKHEAD AND RAIL TRANSPORT SYSTEM

[76] Inventor: George Klein, 10400 S. Ridgeland, Apt. 107, Chicago Ridge, Ill. 60415

[21] Appl. No.: 780,900

[22] Filed: Oct. 23, 1991

Related U.S. Application Data

[62] Division of Ser. No. 589,254, Sep. 28, 1990, Pat. No. 5,076,745.

[51] Int. Cl.$^5$ .............................................. B60P 7/08
[52] U.S. Cl. ...................................... 410/94; 410/104
[58] Field of Search .................. 410/8, 42, 36, 47, 48, 410/49, 50, 94, 97, 100, 101, 102, 104, 115, 120

[56] References Cited

U.S. PATENT DOCUMENTS

| | | | |
|---|---|---|---|
| 2,622,918 | 12/1952 | Staffe | 410/48 |
| 2,828,023 | 3/1958 | Berra et al. | 410/48 X |
| 3,061,255 | 10/1962 | Gallo et al. | 410/48 |
| 3,084,803 | 4/1963 | Bayers | 410/48 X |
| 3,605,638 | 9/1971 | James | 410/49 |
| 4,200,046 | 4/1980 | Koliba et al. | 410/94 |
| 4,451,188 | 5/1984 | Smith et al. | 410/49 X |
| 4,717,298 | 1/1988 | Bott | 410/104 X |

FOREIGN PATENT DOCUMENTS 0074740  4/1988  Japan .................................. 410/104

*Primary Examiner*—Frank E. Werner
*Assistant Examiner*—James Eller
*Attorney, Agent, or Firm*—Basil E. Demeur; Alan B. Samlan

[57] ABSTRACT

An improved bulkhead assembly intended for use in connection with the transportation of materials on a flat rack container, and an improved material transport system employing such bulkhead assembly is shown. The improved material transport system is of the type which includes a flat rack container having at least one open ended rail mounted on the flat rack which includes at least a pair of opposed flat bars mounted in spaced apart relation extending along the lengh of the rack container. The improved bulkhead assembly is formed by a base including an upper plate which rides along the upper support surface of the rail, and a lower locking plate adapted for riding along the lower surface of the rail. Devices are interposed between the upper plate and the lower locking plate for lockingly engaging the base onto the rail at any fixed position along the length thereof. The upper plate of the bulkhead includes a bulkhead support member which is mounted thereon and extends upwardly therefrom and positioned to be in support relationship with respect to a material load carried on the flat rack container. One or more of the bulkheads may be slidingly positioned along the rails on the flat rack in order to hold a material load thereon. The system is further improved by providing a material support arm device adapted for overlying the material load and interposed between a pair of opposed bulkheads which are lockingly engaged on either side of the material load and which may be secured to each of the two bulkheads in order to tie down the material load during transport.

7 Claims, 3 Drawing Sheets

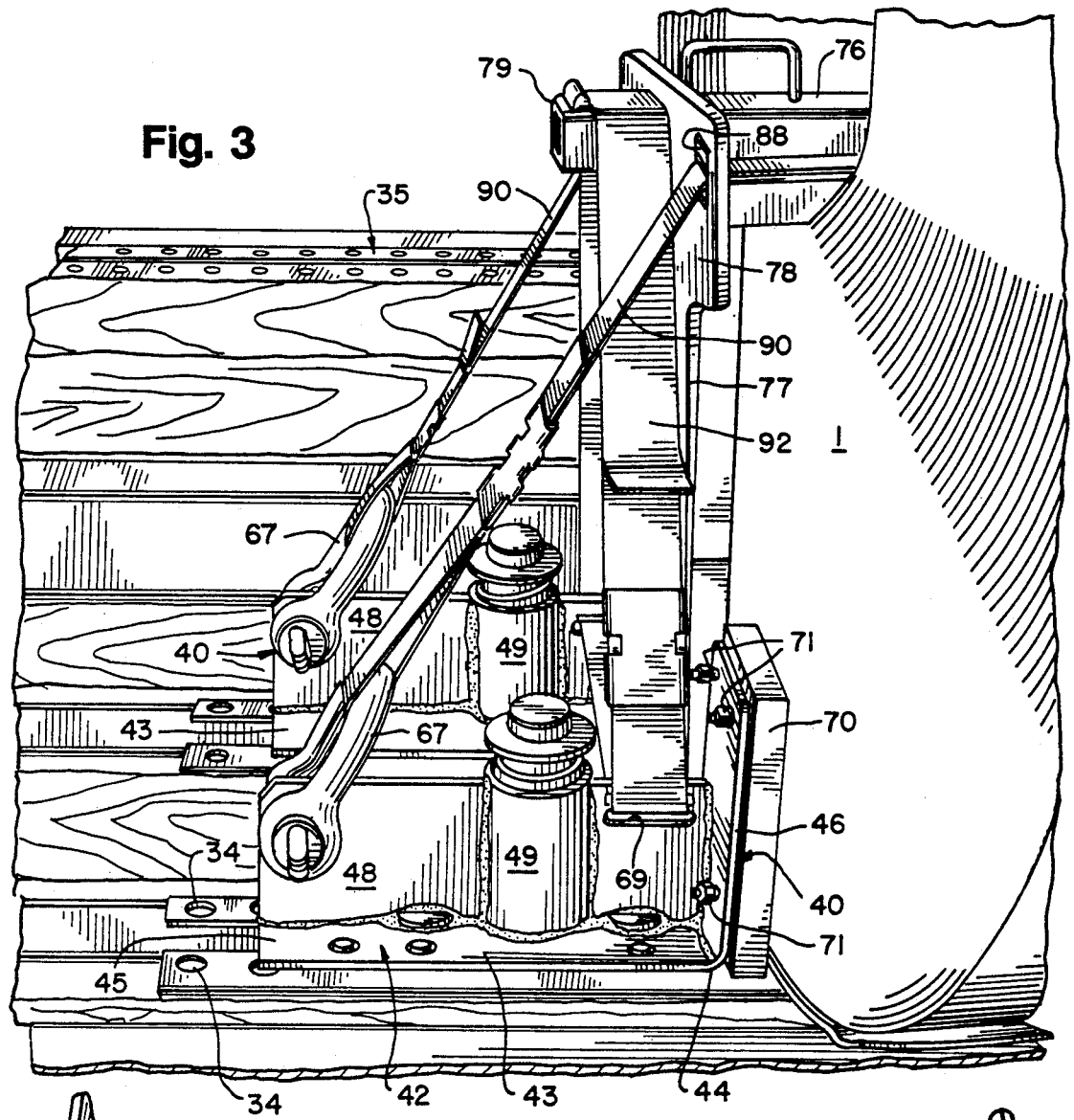
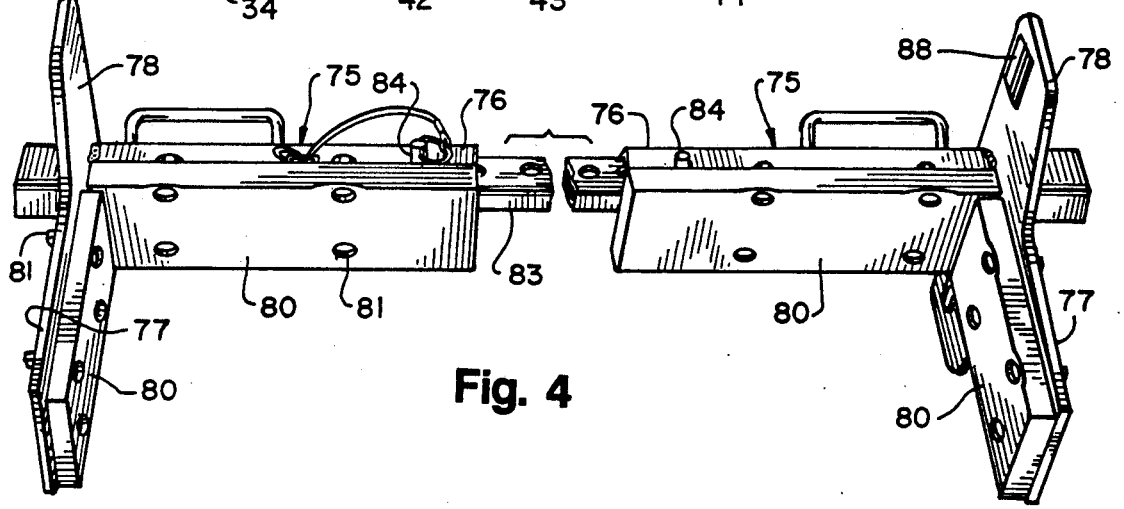

BULKHEAD AND RAIL TRANSPORT SYSTEM

CROSS-REFERENCE TO RELATED APPLICATION

This application is a divisional application of application Ser. No. 589,254, entitled IMPROVED BULKHEAD AND RAIL TRANSPORT SYSTEM, filed on Sep. 28, 1990, naming George Klein as Applicant, now U.S. Pat. No. 5,076,745.

BACKGROUND OF THE INVENTION

The present invention deals with an improved material transport system utilized for transporting either rolled or flat sheet materials on a flat rack container. The improved system includes as a material part thereof, an improved bulkhead assembly which is designed to co-act with the flat rack container which is adapted in order to accommodate the bulkhead assembly in locking engagement thereon.

It is well-known in the material transport field that the typical manner of fastening a material load to a flatbed rack is by utilizing chains, expanding straps, or other types of strapping such that the load to be transported is securely fastened to the flatbed. This is especially true in connection with material loads consisting of rolls of steel which would have a normal tendency to roll off the flatbed unless braced and fastened thereto. The present system employed for fastening a roll of steel material on a flatbed is to provide lower supports on either side of the roll of material at the base thereof, thereby to create curbs on each side of the roll. Chains are then utilized for securing the roll of material to the flatbed. Chains are usually fastened to a fastening member formed on the flatbed at one end, and then usually strung through the center core of the rolled material and fastened down to another opposed fastening member again formed on the flatbed. Chains may also be strung over the top of the roll, so that the roll of material is fastened both front to back, as well as side to side.

It is also well-known that when chains are employed for fastening down a material load such as rolled steel, since the chains are ratcheted down to a tightened position, in order to securely hold the roll of steel in place, the chains have a tendency to bite into the steel, causing damage thereto. It is well-known in the industry that chain damage to steel is a serious problem and results in the loss of significant quantities of material on a yearly basis. In order to minimize this problem, transporters have employed the use of wood braces interposed between the chain and the steel material such that when the chains are ratcheted into a tightened position, the chains will bite into the wood rather than bear against the steel material directly. While this has had some degree of success in resolving the problem of damaged material, nevertheless, it has been found that when these materials are in their transporting mode, material loads tend to shift on the flatbed, and the chains often times do come into direct contact with the steel causing a significant damage. In addition, it has also been found that when the chains are ratcheted into a tightened position, the natural movement of the material load during transport puts additional pressure on the wood braces, often spliting the same which then causes the load to loosen and shift quite dramatically.

Other attempts at resolving this problem have been the use of other types of strapping such as fabric straps which are formed of a tough material, but being non-metallic, have a lesser tendency to damage the steel even when in direct contact therewith. However, due to the weight and pressure forces exerted by the material load during transport, such non-metallic straps have proven to be less than reliable, and are very subject to breakage. For example, a material load consisting of rolled steel not properly secured to the flatbed, may have a tendency to telescope or "accordion-out" when sudden starts or stops of the flatbed are experienced. In such instances, due to the weight of the load, and the pressure exerted during such a telescoping situation, the material load can exert sufficient forces to tear the strapping despite the anticipated strength of such material.

The present invention is intended to improve the material transport system by providing an improved flat rack container, which cooperates with an improved bulkhead system which co-acts therewith such that a material load, whether rolled material or flat material may be securely fastened to a flat rack, while virtually eliminating any possibility of damage to the load. The present invention anticipates that the container is improved by incorporating two or more rails formed into the bed of the carrying surface, and providing an improved bulkhead assembly which may be slidingly engaged onto the rails and into a supporting position with respect to the load. With respect to rolled material which is transported, one bulkhead may be slidingly engaged onto the rails and lockingly engaged in supporting position on one side of the roll, while an opposed bulkhead is inserted onto the rail from the opposed side of the rolled material and lockingly engaged in a supporting position relative to the roll. Each of the bulkheads may be securly locked onto the rails of the flatbed, and the assembly is then completed by providing a support brace which extends through the core of the roll of material, and is securely fastened to each of the two opposed bulkheads. The support brace is securely fastened to each of the bulkheads by the use of strapping which may be either metallic, or non-metallic, but is arranged such that the strapping extends angularly upwardly from the bulkhead to the support brace and is not in touching contact with the material load. Each of the bulkheads includes a support member which is in supporting relationship with respect to the rolled material, and secures the same in place. The support member functions not only as a support for the material, but prevents telescoping of the material during transport. Similarly, the support brace which is employed through the core of the roll of material also is provided with a support member which extends downwardly therefrom, such that the support member of the bulkhead and support wall of the brace cooperate to maintain the roll of material in a fixed and secure position when in the transport mode. Hence, the present system eliminates the use of the chains or any other strapping material which is in touching contact with the material load to be transported, and thereby eliminates the possibility of damage to the material during transport arising from the use of chains, strapping or other such components which would have a tendency to damage the load.

Furthermore, by creating a flat rack container, the container itself may be fastened to any style of intermodal flatcar, such as a flatbed gondola railcar, or flatbed trailer truck. The importance of this system resides in the fact that once the load is secured to the flat rack container, it is the container itself with the load in place which may be transported and moved between the various intermodal flatcar carriers, thereby eliminating the need to remove and re-fasten the load to alternate intermodal flatcars.

OBJECTS AND ADVANTAGES

It is therefore a principal object of the present invention to provide an improved material transport system which basically consists of an improved flat rack container designed to incorporate at least one pair of rails formed into the bed of the flat rack, and co-acts with an improved bulkhead which is designed to mount onto the rails and be lockingly engaged in position at any desired location along the length of the rails.

The present invention also provides an improved bulkhead assembly which is basically formed by a base which includes an upper plate adapted for riding along the upper support surface of the rail in the flat rack container, and a lower locking plate adapted for riding along the lower riding surface of the rail. Means are interposed between the upper plate and the lower locking plate for lockingly engaging the base onto the rail at any desired fixed position along the length thereof with the rail interposed between the upper plate and the lower locking plate. The upper plate includes a bulkhead support member mounted thereon and extending upwardly therefrom and is positioned at the front end thereof.

It is a further object of the present invention to provide an improved bulkhead assembly of the type described wherein the rail formed in the bed of the flat rack container is formed by a pair of opposed flat bars which are in spaced apart relation, thereby to create a track therebetween, each of the flat bars having a plurality of apertures positioned therein and along the length thereof. The bulkhead is formed by a base including an upper plate adapted for riding along the upper surface of the rail, and the lower locking plate is adapted for riding along the lower riding surface of the rail. The upper plate also includes a plurality of linearly disposed apertures formed therein along both side edges thereof, spaced apart a distance to equal and to be in alignment with the apertures formed in the rails. The base is further provided with a bulkhead support mounted thereon and extending upwardly therefrom and positioned at the front end thereby to be in supporting relation with a material load carried on the flat rack container. The upper plate also includes a push rod housing mounted thereon and extending upwardly therefrom which has a bottom wall and a push rod aperture formed therein within the confines of the housing. The lower locking plate is provided with a push rod mounted thereon and extending upwardly therefrom through the push rod aperture in the upper plate and adapted to be seated within the push rod housing of the upper plate. The lower locking plate is further provided with a series of locking pins integrally formed thereon and extending upwardly therefrom, the locking pins being spaced apart a distance and being linearly aligned to mate with corresponding ones of the apertures formed in the rails and the apertures in the upper plate. The push rod includes means for lockingly engaging the push rod in locking relation with the locking pins extending through the apertures in the rails and in the upper plate.

A further object of the present invention is to provide an improved bulkhead assembly of the type described wherein the push rod housing includes biasing means for biasingly urging the push rod upwardly toward the upper plate thereby to normally urge the lower locking plate into locking relation against the rails with the locking pins engaged within corresponding apertures in the rails in the upper plate. In this manner, the bulkhead assembly may be lockingly engaged to the rails at a plurality of points along the length thereof.

Still a further object of the present invention is to provide an improved bulkhead assembly of the type described, wherein the biasing means comprises a coil spring which is interposed between the bottom wall of the push rod housing and an upper cap flange formed on the push rod, the coil spring normally biasingly urging the push rod and the lower locking plate upwardly into locking engagement with the rails and the upper plate.

A further improvement consists of providing an improved bulkhead assembly of the type described wherein the push rod housing and push rod are further provided with locking means for lockingly engaging in the push rod in fixed position within the confines of the push rod housing thereby to securely lock the bulkhead assembly to the rails formed in the flatbed of the gondola.

Still a further object of the present invention is to provide an improved material transport system for transporting materials, which includes an improved flat rack container formed by a material support surface having a forward end, a rear end and opposed side edges, the flat rack container provided with a centrally disposed well formed therein and extending along the length thereof from the forward end to the rear end thereof, the well being provided with a pair of open ended rails formed therein, one of each of the rails extending along the length from the forward end to the rear end of the rack container and positioned in spaced apart relation. Each of the rails is formed by opposed flat bars positioned in spaced apart relation thereby forming an open track therebetween, the well being adapted to carry materials therein for transporting purposes.

An improved bulkhead assembly is provided, the bulkhead assembly being formed by a base including an upper plate adapted for riding along the upper surface of the rail, and a lower locking plate adapted for riding along the lower riding surface of the rail, and means interposed between the upper plate and the lower locking plate for lockingly engaging the base onto the rails at any desired position along the length of the rail. The upper plate of the base is provided with a bulkhead support member which is mounted thereon and integrally formed therewith, and extends upwardly therefrom, the support member being adapted to be positioned in support relation with respect to a material load carried in the well of the flat rack container.

In conjunction with the foregoing object, it is a further object of the present invention to provide an improved material transport system and bulkhead assembly of the type described, which further includes a material support arm adapted for overlying the material load and being interposed between a pair of bulkheads lockingly engaged on opposed sides of the material load such that the material load may be secured and positioned between opposed bulkheads, and locked into position by means of the material support arm means which is fastened at one end to one bulkhead, and at the opposed end to the opposed bulkhead, whereby the material carried in the well of the flat rack container is properly curbed, and is secured onto the flat rack by the bulkheads, and the material support arm means.

In conjunction with the foregoing object, it is a further object to provide an improved material transport system and an improved bulkhead assembly of the type described, wherein the support arm means is provided with a further material support wall mounted thereon and extending downwardly therefrom, the support wall of the support arm cooperating with the support member formed on the bulkhead assemblies such that the material load is secured onto the flat rack container in a manner which prevents any side-to-side movement, and prevents any telescoping of the material load during transport.

Still a further object of the present invention is to provide an improved material transport system of the type described, wherein the flat rack container is further improved by providing a centrally disposed well in the flatbed surface, adapted to carry materials therein, the well including a pair of spaced apart rails formed therein in order to accommodate an improved bulkhead assembly lockingly engaged thereon, and wherein the flatbed further includes a second pair of rails formed in the bed of the flat rack container along the side edges thereof, similarly adapted to carry an improved bulkhead assembly of the type described such that a material load which exceeds the span of the centrally disposed well may be positioned on the flat rack container, and the supporting bulkhead assemblies are mounted onto the outer side rails of the flatbed thereby to lockingly engage the load in position for transport purposes.

Further features of the invention pertain to the particular arrangement of the parts and elements whereby the above outlined and additional operating features thereof are attained. The invention, both as to its organization and method of operation will best be understood by reference to the following specification, and the accompanying drawings.

SUMMARY OF THE INVENTION

In summary, the present invention provides both an improved material transport system, and further, provides an improved bulkhead assembly which is utilized in conjunction with such system which is designed to support a material load carried on a flat rack container in a secure manner and eliminating the need for chains or other strapping material which is in touching contact with the material load to be transported.

The improved material transport system includes an improved flat rack container which is improved by providing the flat container with a centrally disposed well which is typically utilized for the purpose of carrying rolled material, the well incorporating a pair of rails formed therein in spaced apart relation, the rails accommodating the locking engagement thereon of an improved bulkhead which is designed in accordance with the present invention. The flat rack container is further improved by incorporating a second pair of rails formed along the outer side edges of the flat rack container, such that flat sheet goods which are intended to be transported may similarly be secured into position by utilizing the same improved bulkhead assemblies as described hereinafter, thereby providing a flat rack container which has universal capability of transporting any type of material, whether rolled or flat, and may be moved between various types of intermodal flatcars without changing or moving the material load carried thereon.

The invention herein further provides an improved bulkhead assembly, which basically consists of a base formed by an upper plate adapted for riding along the upper support surface of the rail, and a lower locking plate adapted for riding along the lower riding surface of the rail, and means interposed between the upper plate and the lower locking plate for lockingly engaging the base onto the rail at a plurality of fixed positions along the length of the rail with the rail being interposed between the upper plate and lower locking plate such that the bulkhead may be securely lockingly engaged to the rail at a plurality of points along the length thereof. The upper plate is further provided with a bulkhead support member which is mounted thereon and extends upwardly therefrom and positioned at the front end thereof such that the support member is adapted to be positioned in support relation with respect to a material load carried on the flat rack container. The invention further contemplates that at least one pair of bulkhead assemblies are utilized on opposed sides of a load of material, for holding the material load in position therebetween, and an improved material support arm is provided which overlies the material load, and it may be securely fastened to one bulkhead assembly at one end thereof and to the opposed bulkhead assembly at the opposed end thereof, the points of connection being designed to eliminate contact between the material load and the strapping employed for strappingly engaging the support arm to each of the bulkhead assemblies.

BRIEF DESCRIPTION OF THE DRAWINGS

FIG. 3 is a side perspective view showing the details of construction of the improved bulkhead assembly in conjunction with the improved flat rack container and the manner in which the same co-act to secure a rolled material load thereon;

FIG. 4 is a perspective view, partly broken away, showing the details of construction of material support arm means adapted to support and the material load carried on the flat rack in overlying relationship thereon;

DETAILED DESCRIPTION OF DRAWINGS

Figure 1:
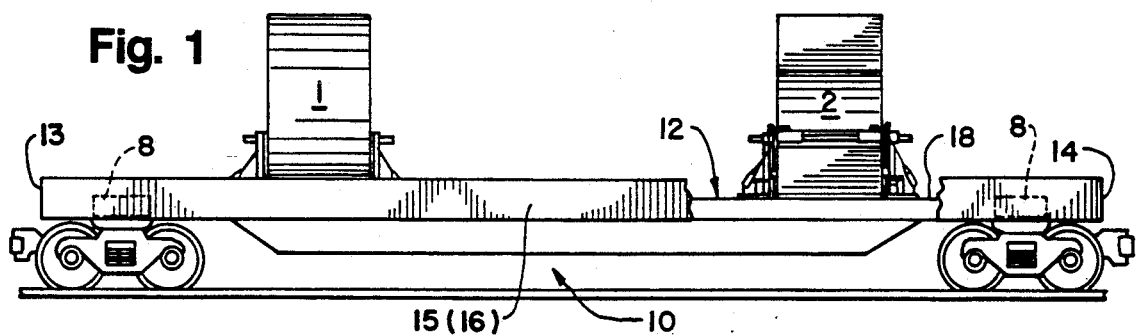
FIG. 1 is a side elevational view showing a flat rack container of the present invention improved by providing a well centrally disposed along the entire length of the flat rack container capable of carrying material loads therein.

In FIG. 1 of the drawings, a rail car flatbed gondola is illustrated, which carries thereon the improved flat rack container of the present invention. The flat rack container 10 includes a flatbed carrying surface 12 which is bounded by a front end 13, rear end 14, and opposed side edges 15 and 16 respectively. As depicted in FIG. 1 of the drawings, a typical load of rolled steel 1 and 2 respectively, is shown being carried thereon for transport purposes.

Figure 2:
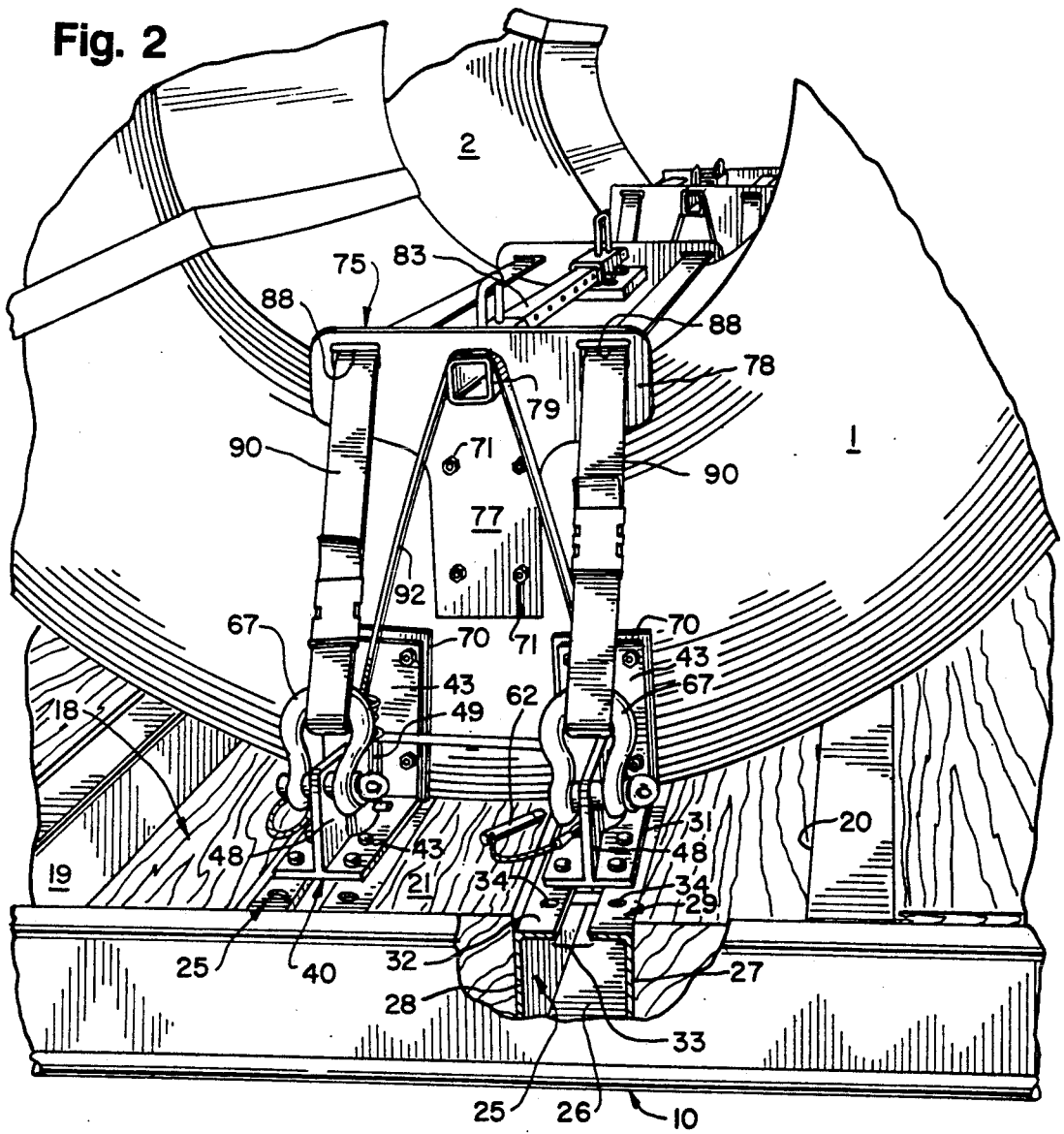
FIG. 2 is a perspective view showing the material transport system of the present invention including the improved flat rack container, and the improved bulkhead assemblies and material support arms associated therewith for securely fastening a material load onto the flat rack container.

It will be observed from both FIGS. 1 and 2 of the drawings, that the flat rack container 10 of the present invention is shown to include a well 18 which is centrally positioned along the entire length of the flat rack container and extends from the front end 13 to the rear end 14. As shown in both FIGS. 1 and 2 of the drawings, the present invention contemplates that the rolls of steel 1 and 2 being carried on the container 10 would be positioned within the confines of the well 18, the side edges of the well functioning as curbs for maintaining the rolls 1 and 2 when in position thereon. As particularly shown in FIG. 2 of the drawings, the well 18 is bounded by upright side walls 19 and 20 respectively, and a bottom support wall 21. It will be appreciated that by providing a well 18 centrally disposed along the length of the container 10, the need for providing extraneous curbs in the form of braces such as wood or steel braces on either side of the rolls of material 1 and 2 is eliminated. As was previously indicated, typically for transporting rolled material, the material is braced into position on the flatbed by inserting wood braces on either side of the roll thereby to form curbs for preventing the material from rolling off of the flat rack. Hence, the well 18 being formed as part of the flat rack container, eliminates such extraneous steps in the transport process.

It will also be observed that the well is provided with a pair of box rails 25 which are carried in the bottom support wall 21 of the well 18. Each box rail is formed by a bottom wall 26, upwardly extending side walls 27 and 28, and an upper support surface 29. The upper support surface 29 is formed by a pair of opposed flat bars 31 and 32 respectively, which are positioned in spaced apart relation thereby to form an open track 33 therebetween. The box rail 25 is completed by providing a plurality of apertures 34 which are formed therein along the entire length of the rail, as more particularly shown in FIGS. 3 and 5 of the drawings.

It will be appreciated from the description herein, that the flat rack container 10 referred to herein is designed to be lockingly engaged by a locking device 8 onto the flatbed of any of the various types of intermodal flatcars, such as rail cars or flatbed trucks of the type used for hauling loads over the road. Hence, the flat rack container, with a material load mounted thereon, may be transferred between various intemodal flatcars for ease of transport. This eliminates the need to move the material load once secured onto the flat rack container in those instances where both rail and over the road flatcars must be utilized to deliver a certain load.

It will also be noted from a view of FIG. 3 of the drawings that the flat rack container 10 of the present invention is further designed to include an additional pair of box rails 35 which are mounted thereon along the outer side edges 15 and 16 respectively thereof. It will be appreciated from the following description that by providing the flat rack container 10 with additional outer box rails 35, other loads carried on such a rack container may be stabilized in position in accordance with the use of the bulkhead assembly to be described hereinafter.

Figure 5:
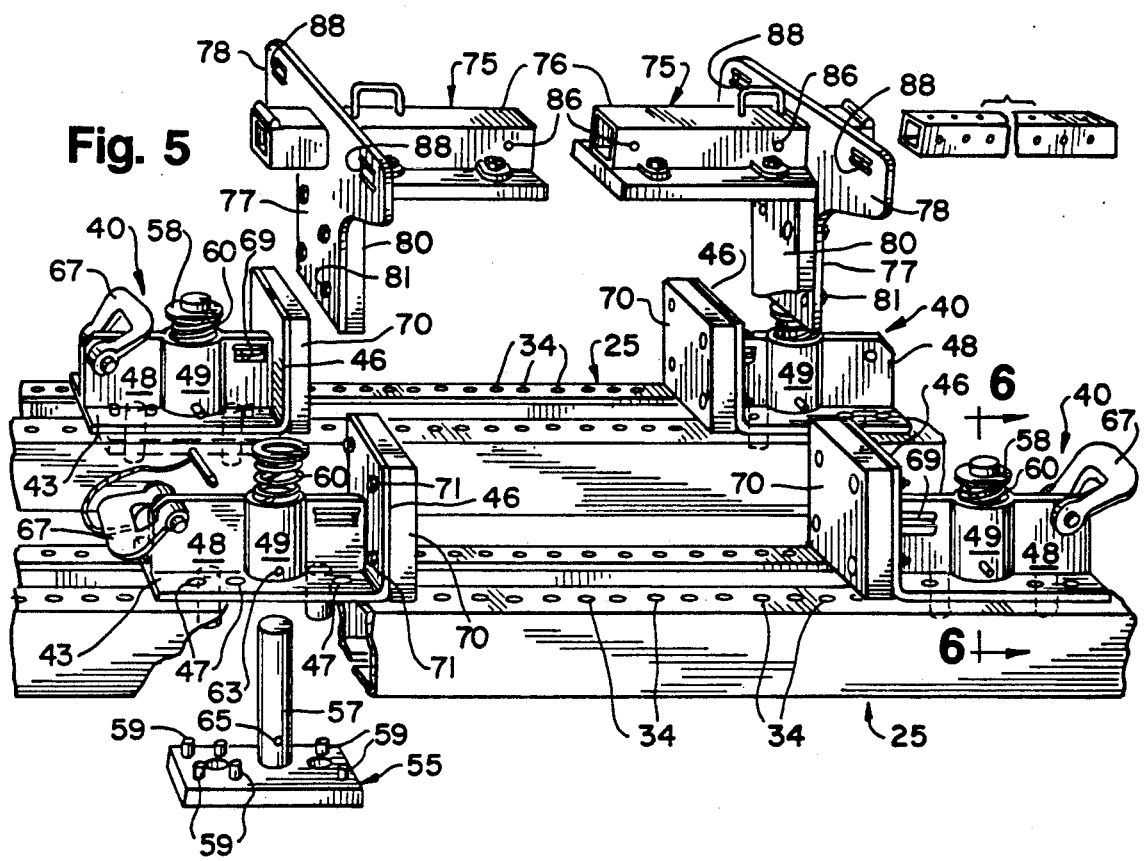
FIG. 5 is a perspective view, partly exploded, showing the details of construction and the method of attachment of the improved bulkhead assemblies to the rails of the flat rack container, and the configuration of a centrally disposed material support arm in relation to the bulkhead assemblies.
Figure 6:
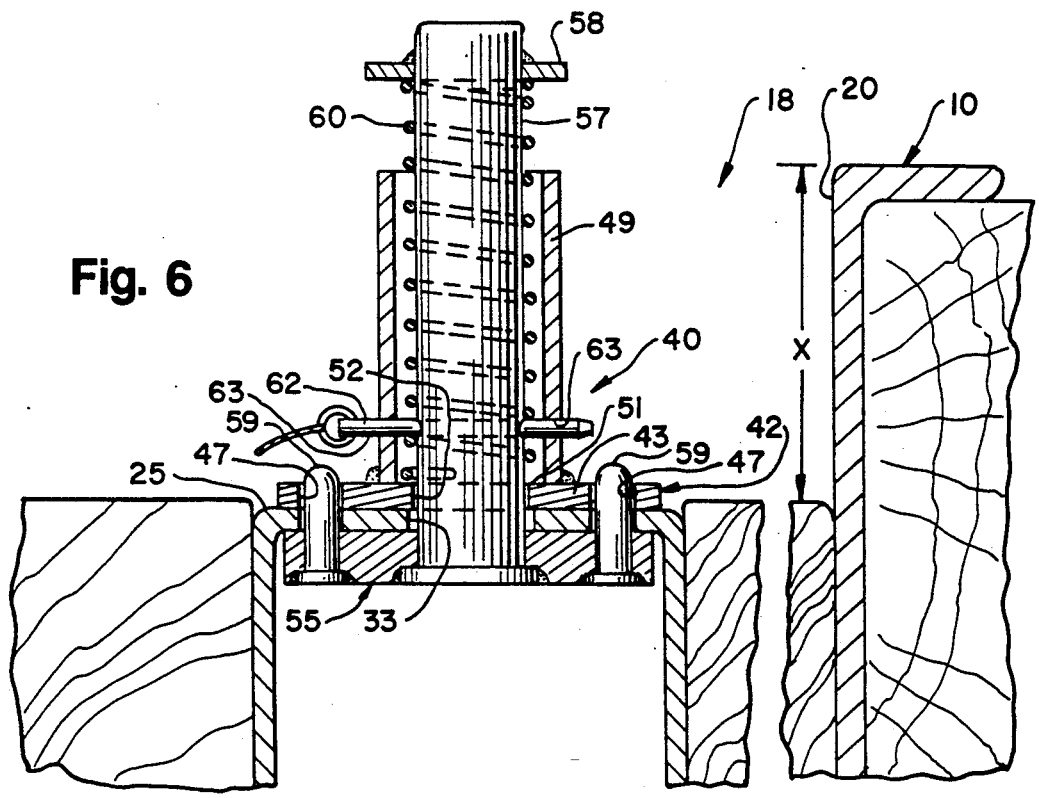
FIG. 6 is a side elevational view in cross-section, showing the manner in which the bulkhead assembly of the present invention is lockingly engaged onto the rail of the flat rack container for securing the same in supporting position thereon.

In FIGS. 3, 5, and 6 of the drawings, the details of construction of the improved bulkhead assembly of the present invention are illustrated. The following description shall be in conjunction with primarily FIGS. 3, 5, and 6 of the drawings.

The improved bulkhead assembly is shown more specifically in FIGS. 3, 5, and 6 of the drawings. As noted therein, the bulkhead 40 is formed by a base 42 consisting of a lower support plate 43 which has a forward end 44 and a rear end 45. The forward end 44 includes a support member 46 which is formed integrally therewith and extends upwardly therefrom. Extending from the forward end 44 to the rear end 45 is a gusset plate 48 which is positioned centrally of the support plate 43 and extends upwardly therefrom. The gusset plate 48 is secured to the forward support member 46 such as by a weld or other suitable means, and provides a structural rigidity for the bulkhead 40. Positioned at the approximate central point of the support plate 43 of base 42 is a push rod housing 49 which is again secured to and integral with the gusset plate 48. The push rod housing 49 includes a bottom wall 51 which is provided with a central push rod aperture 52 formed therein.

The bulkhead 40 is further provided with a lower locking plate 55 which is adapted for riding along the lower surface of an appropriate rail 25 as depicted in FIG. 6 of the drawings. The lower locking plate 55 is provided with a push rod 57 which is fixedly mounted thereon and extends upwardly therefrom.

With respect to the support plate 43, it will be noted that the support plate includes a series of pin apertures 47 formed therein and positioned along the opposed side edges thereof. The lower locking plate 55 includes a plurality of locking pins 59 securely mounted thereon and extending upwardly therefrom, the locking pins 59 being positioned such that the same are in vertical alignment with the apertures 34 located along the length of the rail 25, as well as the pin apertures 47 formed in the support plate 43. The upper end of the push rod 57 is provided with a flange cap 58 which is secured thereto, and it will be observed that a coil spring 60 surrounds the push rod 57, and extends between the lower side of the cap flange 58 down to the bottom wall 51 of the push rod housing 49. Due to this configuration, it will be appreciated that the push rod 57 tends to be normally biasingly urged upwardly such that the lower locking plate 55 is pulled up against the lower riding surface of the rails 25, with the locking pins 59 engaged through the rail apertures 34 and through the pin apertures 47 of the support plate 43. It will be appreciated from a view of FIG. 5 of the drawings that in view of the fact that the rail 25 contains a series of apertures 34 positioned along the entire length of the rail 25, that the entire bulkhead assembly 40 may be slid onto a corresponding rail 25, and by exerting downward manual force against the push rod 57, such that the locking pins 59 of the lower locking plate 55 disengage from the corresponding apertures 34 and 47 respectively, the entire bulkhead assembly 40 may be slid along the length of the rail to any desired position. Locking engagement of the bulkhead assembly 40 to the rail 25 will occur once the locking pins 59 are positioned in alignment with corresponding apertures 34 and 47 respectively, and the coil spring 60 is allowed to biasingly urge the push rod 57 upwardly such that engagement of the locking pins 59 occurs via the apertures 34 and 47 respectively. Once the bulkhead assembly 40 is secured to the rail 25 in the desired location, and the push rod 57 has biasingly urged the lower locking plate 55 into locking engagement with the rail 25, the push rod 57 may be locked relative to the push rod housing 49 by means of a lock rod 62 as shown in FIG. 6 of the drawings. It will be observed that the push rod housing 49 is provided with a pair of opposed apertures 63 formed along the lower end thereof, and that the push rod 57 is provided with a lock rod aperture 65 traversing therethrough, such that when the lock rod aperture 65 is in vertical alignment with the rod apertures 63 formed in the push rod housing 49, the lock rod 62 may be inserted to therethrough thereby locking the push rod 57 in its upstanding position relative to the push rod housing 49 and the bulkhead 40. This construction tends to normally lockingly engage the lower locking plate into locking engagement with respect to the support plate 43, with the flat bars 31 and 32 of the rail 25 interposed therebetween. It will therefore be appreciated that the bulkhead assembly 40 may be easily but securely locked onto the rail 25 in a plurality of desired positions along the length thereof, with the upstanding support member 46 positioned in supporting relationship with respect to a material load carried on the flatbed gondola 10. Furthermore, by providing a pair of rails 25 within the confines of the well 18, two bulkheads 40 may be positioned on either side of the material load for additional support and stability, as more clearly shown in FIGS. 2 and 3 of the drawings.

With respect to the bulkhead 40, it will be observed that the gusset plate 48 is provided with a band connector 67 pivotly secured along the rear end thereof, and provides a connecting point for appropriate bands to be secured thereto when the load is strapped onto the flat rack container 10 in a manner to be more precisely explained hereinafter. It will further be observed that the forward end of the gusset plate 48 is provided with a strap slot 69 positioned at the forward end of the bulkhead 40 and again provides a convenient connecting point for a vertical band strap utilized for strapping the material load down to the flat rack container 40, again as will be more fully explained hereinafter.

In the preferred version of the improved bulkhead 40, it will be observed that the forward support member 46 is provided with a material bumber 70 which may be secured thereto by bolts 71, or any other suitable fastening means. As depicted in FIG. 3 of the drawings, the material bumpers 70 are intended to provide a secure cushion against the roll of steel 1 carried on the flat rack container 10. The material bumpers 70 may be formed of any suitable material, although it has found that a plastic material such as polyethylene plastic or any other hard but resilient plastic may be employed. Any suitable rigid but somewhat resilient material may be employed, such as rubber or other such materials.

As shown in FIGS. 4 and 5 of the drawings, the bulkhead assembly further includes a material support means intended for overlying the material load which is formed by a pair of opposed "L" shaped bracket arms 75. Each "L" shaped bracket arm 75 is formed by a horizontally disposed bracket tube 76 which is hollow throughout its interior, and a material support leg 77 which is mounted on the bracket tube 76 and disposed vertically with respect thereto and extends vertically at a 90 degree angle therefrom. The upper portion of each support leg 77 is shown to include a "T" shaped upper head 78 which basically serves a material support function as principally shown in FIG. 2 of the drawings. It will be observed that the bracket tube 76 extends horizontally outwardly for a distance beyond the outer surface of the upper support head 78, forming a tube extension portion 79, as more clearly shown in FIG. 3 of the drawing. The "L" shaped bracket arm 75 may similarly be provided with a horizontal as well as a vertical material bumper 80 which is secured thereto by bolts 81 or other appropriate fastening means. Once again, the material bumpers 80 are formed of a polyethylene material, or any other substantially rigid but somewhat resilient material, which would include rubber, or other well-known such materials. Once again, the purpose of the material bumpers is to provide a cushioning surface once the bulkhead assembly 40 is lockingly engaged against the material load in order to prevent damage to the side edges of the material intended to be transported.

As shown in FIG. 2 of the drawings, once a pair of opposed "L" shaped bracket arms 75 have been positioned on either side of the roll of steel 1, a telescoping arm 83 is inserted within the confines of the bracket tubes 76 and locked into position with respect to each "L" shaped bracket arm 75 by means of a lock pin 84 (see FIG. 4). It will be observed that the bracket tubes 76 are provided with lock pin apertures 86, and further, that the telescoping arm 83 is apertured along the length thereof, such that once the telescoping arm is inserted through the bracket tubes 76, and the bracket tubes 76 on opposed sides of the material load pushed into position against the side edges of the material load, the lock pins 84 may be inserted through the lock pin aperture 86 thereby locking the "L" shaped bracket arms in position on opposed sides of the load.

With reference to FIGS. 2 and 3 of the drawings, it will be observed that the "L" shaped bracket arm 75 are then lockingly engaged to the respective bulkheads 40, by means of band straps in the manner illustrated. It will be observed that each of the upper "T" shaped support heads 78 are provided with band slots 88 on each opposed side of the "T" shaped head 78, in order to accommodate appropriate band straps therethrough for stappingly locking the material load such as a roll of steel 1 onto the flat rack container 10.

Once again, with reference to FIGS. 2 and 3 of the drawings, it will be observed that once the roll of steel 1 is positioned onto the rack container within the confines of the well 18, and the respective bulkheads 40 slidingly engaged onto an appropriate rail 25 and slid into position against the roll of steel 1, and locked into position in the manner indicated, the "L" shaped bracket arms are then positioned on opposed sides of the material load as illustrated. Strapping bands are then employed in the following manner. It will be observed that a first strapping band 90 is passed through the band slots 88 and each of the opposed "L" shaped bracket arms 75, and connected to the band connector 67 on a corresponding bulkhead 40. This procedure is employed on each side of the "T" shaped support head 78, such that the entire support leg 77 is secured to all four bulkheads 40 positioned on opposed sides of the material load 1. The strapping band 90 therefore is connected to a band connector 67 of one bulkhead, passed through the band slots 88 of the "T" shaped upper head 78 and through the opposed band slot 88 of the opposed "L" shaped bracket arm 75 and connected to the opposed bulkhead band connector 67. This procedure occurs on both sides of the "T" shaped upper support head 78. It will then be observed that a second strapping band 92 is positioned around the tube extension portion 79 of the bracket tube 76, and passed through linearly aligned strap slots 69 formed in the gusset plate 48 of each bulkhead 40. This strapping procedure is shown in FIGS. 2 and 3 of the drawings as well.

The strapping procedure as indicated above will make it clear that in this manner, the second strapping band 92 which overlies the tube extension portion 79 and passes through the respective strap slot 69 formed in the gusset plates 48 of each bulkhead 40 will exert a downward force thereby to draw or pull the load downward onto the flat rack container 10, and secure the same in that direction. The first strapping bands 90 secure the load as between the band connector 67 on each bulkhead 40 and go from side to side, or that is from forward end to rear end with respect to the flat rack container 10, and tend to secure the load in a lateral direction as well as a downward direction. Furthermore, it will be observed with respect to FIG. 2 of the drawings that the support leg 77 having a "T" shaped upper support head 78 clearly forms a material support with respect to the upper portion of the roll of steel 1, while the support members 46 form a material support for the lower portion of the roll of steel 1 once the entire assembly has been secured and positioned.

Furthermore, it will be clear that the bulkhead assembly of the type described herein may be employed with respect to a stack of flat sheet material which is to be transported, since the bulkheads 40 may similarly be positioned adjacent to a stack of flat sheet goods contained on a container, and the "L" shaped bracket arms 75 positioned in overlying relationship with respect to each stack of material. The same banding procedure could be employed in order to secure the load down onto the flat rack container 10.

It will further be appreciated while the support members 46 forming a part of the bulkhead 40 are shown to be relatively short, it will be appreciated that the support members 46 may be formed to be elongated or enlarged such that the same extends upwardly for substantial distance. Indeed, it is contemplated that bulkheads of this construction may be produced which are specifically intended for supporting stacks of flat sheet goods which are intended to be transported. In such an event, the bulkhead assembly 40 will be identical to that as described herein, with the exception that the support members 46 will be somewhat elongated but otherwise, constructed in the manner as indicated herein.

As was indicated previously, and as is depicted in FIG. 3 of the drawings, the flat rack container 10 may be designed such that a pair of opposed outer box rails 35 are formed in the surface of the flat rack container 10 along opposed side edges thereof. Bulkheads 40 of the type described herein may be utilized in the same manner as depicted in the drawings herein by positioning the same along the length of the outer box rails 35 to a desired position, and lockingly engaged thereon. It is contemplated that where loads of flat sheet goods are transported which would not be positionable within the well 18, may be laid across the entire surface of the flat rack container 10, and the bulkheads then slid into corresponding outer box rails 35 in the same manner as heretofore described. Once again, the loads would be secured in position by utilizing a pair of opposed "L" shaped bracket arms 75 in the same manner as indicated, with the exception that the second strapping band 92 would have to extend from one side edge of the flat rack container 10 to the opposed side edge thereof and secured in position in the same manner as indicated in FIG. 2 of the drawings.

It will be appreciated that a bulkhead assembly of the type described herein when utilized in connection with the improved flat rack container of the type described achieves a more secure locking of the load onto the container and eliminates the need for the use of chains, or other such strapping materials which heretofore have caused damage to material loads. Furthermore, by incorporating rails into the construction of the flat rack container in the manner indicated herein, and employing the improved bulkheads of the type described herein, the bulkheads may be easily mounted and engaged onto the flat rack container and lockingly secured in position thereon where desired. Indeed, the entire process may be done by a single workman while current techniques usually require two or more personal in order to secure a load in position.

It is contemplated that within the scope of the present invention, the bulkhead 40 as well as the "L" shaped bracket arm 75 are formed with a heavy gage steel material in order to lend strength and rigidity as well as support to the loads being transported. In terms of the box rails 25 and 35 respectively, once again, a box rail has been selected in the preferred embodiment of the invention, although it will be understood that the essence of providing the rails 25 and 35 is to provide a configuration for the flatbed portion of the container which is formed by a pair of opposed flat bars spaced apart a distance in order to form an open track therebetween. The flat bars are apertured along the length thereof such that the operator will have multiple choices for positioning the bulkheads at a desired point along the length thereof, and lockingly engaging the same in position.

In terms of the flat rack container, it will be appreciated from the above description that virtually the only change required in order to create a flat rack container in accordance with the scope of the present invention is to provide a well along the central portion of the flatbed, thereby creating a curbing which is formed as a part of the flat rack. It will be appreciated, however, that presently existing flatcars may be employed, the only alteration necessary would be the installation of appropriate rails as indicated in order to accommodate the improved bulkhead assembly as described herein. In such an event, the loads would be maintained on the flatcar by means of manufactured curbing, such as by providing sections of bracing formed of wood, steel or any other material, as is presenty done in the art. However, by creating the flat rack container in the manner indicated herein, this eliminates the need for the operator to locate and fashion bracing for the material loaded onto the flat rack container, and therefore, eliminates time and manual effort in connection with loading the flatbed.

It will therefore be appreciated from the above description that the present invention provides an improved material transport system for transporting the loads of material on any intermodal flatcars, regardless of whether the load of material is in the form of rolled material such as rolled steel, or flat material such as flat sheets of steel, fiber board or the like. The invention, in essence, provides an improved construction for a flat rack container which incorporates a centrally disposed well in the body of the flatbed to create a curbing structure for curbing rolled material, and incorporating rails into the flat rack construction which will accommodate the locking engagement thereto of the improved bulkhead assembly. The improved bulkhead assembly is designed to slidingly engage onto the rails of the flat rack and afford the operator the opportunity to lockingly engage the bulkheads in any desired position. The overlying "L" shaped bracket arms are provided in order to lock the load down onto the bulkheads once the same are installed in position, and insure that the load is secured from both lateral movement, as well as forward and backward movement. Furthermore, by providing pairs of rails, the operator may then employ pairs of bulkheads on opposed sides of the load and insure that the load is securely locked onto the flat rack container for transport purposes. It will be appreciated, however, that depending upon the intended purpose, single rail gondolas may be employed for accommodating a single bulkhead, in such applications as the operator may deem desirable.

While there has been described what is at present considered to be the preferred embodiment of the invention, all such modifications as fall within the true spirit and scope of the invention are intended to be covered by the appended claims.

I claim:

1. A material transport system for transporting materials on a flat rack container adapted for use in connection with intermodal flatcars, comprising, in combination, an improved flat rack container formed by a material support surface having a forward end and a rear end and opposed side edges, said flat rack container including locking means for lockingly engaging said flat rack container onto an intermodal flatcar, said flat rack container further provided with a centrally disposed well formed therein and extending along the length thereof from said forward end to said rear end thereof, said well adapted to carry said materials therein for transportation purposes, said well provided with a pair of open ended rails formed therein, one of each of said rails extending along the length from the forward end to the rear end of said flat rack container and positioned in spaced apart relation, each of said rails formed by opposed flat bars positioned in spaced apart relation thereby forming an open track therebetween, said rails further provided with a plurality of pin apertures positioned along the length of said flat bars, each of said rails having an upper support surface and a lower riding surface, an improved bulkhead formed by a base including an upper plate adapted for riding along the upper support surface of said rails, said upper plate having a front end, and rear end and a pair of opposed side edges, said upper plate being provided with a plurality of pin apertures disposed along the length thereof and along each of the said side edges thereof, said rail apertures and said upper plate apertures being spaced such that said rail apertures and said upper plate apertures are in alignment, a lower locking plate adapted for riding along the lower riding surface of said rails, means interposed between said upper plate and said lower locking plate for lockingly engaging said base onto said rails at a plurality of fixed positions along the length thereof with said rails interposed between said upper plate and said lower locking plate, said means for lockingly engaging comprising a plurality of locking pins mounted on said lower locking plate and extending upwardly therefrom, said locking pins being spaced to align with said rail apertures and said upper plate apertures, said upper plate including a bulkhead support member mounted thereon and extending upwardly therefrom and positioned at the front end thereof, and said bulkhead support member adapted to be positioned in support relation with respect to material load carried in said well of said flat rack container, whereby a material load positioned in said well for transport purposes may be secured thereon by lockingly engaging one bulkhead onto the rails at one side of said material load and lockingly engaging a second bulkhead on the opposed side of said material load thereby to secure said load between said opposed bulkhead, and whereby said bulkhead may be lockingly engaged along the length of said rails by moving said base to a desired position and engaging said locking pins through corresponding apertures in said rail and through apertures in said upper plate thereby to lock said bulkhead in place and secure the material load carried in said well, and said flat rack container may be lockingly secured onto an intermodal flat car for transport purposes.

2. The material transport system as set forth in claim 1 above, wherein said upper plate is further provided with a push rod housing mounted thereon and extending upwardly therefrom and spaced rearwardly from said bulkhead support member and having a bottom wall and a push rod aperture formed therein within the confines of said housing, said lower locking plate provided with a push rod mounted thereon and extending upwardly therefrom through said push rod aperture and said upper plate and adapted to be seated within said push rod housing, said push rod including means for lockingly engaging said push rod with respect to said housing and with said locking pins extending through said apertures in said rails and said upper plate, whereby said bulkhead may be lockingly engaged on said rails in a fixed position along the length thereof with said bulkhead support member in supporting position against the material load carried within said well of the flat rack container.

3. The material transport system as set forth in claim 2 above, wherein said push rod housing includes biasing means for biasingly urging said push rod upwardly toward said upper plate thereby to urge said lower locking plate into locking relation against said rails with said locking pins engaged within corresponding apertures in said rails and said upper plate.

4. The material transport system as set forth in claim 3 above, wherein said push rod includes an upper cap flange fixedly secured to the upper end thereof, and said biasing means comprises a coil spring interposed between said bottom wall of said push rod housing and said upper cap flange, said coil spring normally biasingly urging said push rod upwardly thereby urging said lower locking plate into locking engagement with said rails and said upper plate.

5. The material transport system as set forth in claim 4 above, wherein said push rod housing and push rod are further provided with push rod locking means for lockingly engaging said push rod in a fixed lock position within the confines of said push rod housing.

6. The material transport system as set forth in claim 5 above, wherein said push rod locking means comprises a pair of opposed pin apertures formed in said push rod housing, and said push rod having a pin aperture extending therethrough, and a lock pin adapted to extend through said pin apertures in said push rod housing and said pin aperture in said push rod when said respective pin apertures are positioned in horizontal alignment.

7. The material transport system as set forth in claim 6 above, wherein said upper plate further includes a gusset support wall mounted thereon and extending upwardly therefrom, said gusset support wall extending between the front and rear ends of said upper plate, and said gusset support wall provided with at least one band connector carried thereon and adapted to provide a connecting point for material support bands to be connected thereto.

* * * * *